(12) United States Patent
Raja

(10) Patent No.: US 12,440,403 B2
(45) Date of Patent: Oct. 14, 2025

(54) SMALL ELECTRIC VEHICLE

(71) Applicant: SUZUKI MOTOR CORPORATION, Hamamatsu (JP)

(72) Inventor: Gopinath Raja, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 940 days.

(21) Appl. No.: 17/580,253

(22) Filed: Jan. 20, 2022

(65) Prior Publication Data
US 2022/0233377 A1 Jul. 28, 2022

(30) Foreign Application Priority Data

Jan. 28, 2021 (JP) ................................. 2021-012217

(51) Int. Cl.
A61G 5/10 (2006.01)
A61G 5/04 (2013.01)
B62D 11/04 (2006.01)

(52) U.S. Cl.
CPC .............. *A61G 5/1051* (2016.11); *A61G 5/04* (2013.01); *B62D 11/04* (2013.01); *A61G 2203/14* (2013.01)

(58) Field of Classification Search
CPC .... A61G 5/1051; A61G 5/04; A61G 2203/14; B62D 11/04
USPC ........................................................ 180/6.5
See application file for complete search history.

(56) References Cited

U.S. PATENT DOCUMENTS

| 2003/0010545 | A1 | 1/2003 | Takeuchi | |
| 2003/0020342 | A1 | 1/2003 | Takeuchi | |
| 2022/0370270 | A1* | 11/2022 | Raja | B60L 15/20 |

FOREIGN PATENT DOCUMENTS

| CN | 208169499 U | | 11/2018 |
| JP | 4193496 B2 | | 12/2008 |
| JP | 2010247724 A | * | 11/2010 |
| JP | 2014064620 A | | 4/2014 |
| JP | 2015024016 A | * | 2/2015 |
| JP | 2015119817 A | * | 7/2015 |

OTHER PUBLICATIONS

Extended European Search Report issued in International Application No. 21213591.7 on May 31, 2022.

* cited by examiner

*Primary Examiner* — Jacob D Knutson
(74) *Attorney, Agent, or Firm* — TROTUMAN PEPPER LOCKE LLP

(57) ABSTRACT

A small electric vehicle includes: a body with a forward, backward, and a width direction; left and right driving wheels in the width direction of the body; free wheels, apart from the driving wheels, in the forward and backward direction; left and right motors to respectively transmit power to the left and right driving wheels; left and right rotation speed sensors detecting rotation speeds of the respective motors; an operation unit with an operation element; and a control unit controlling the motors according to an operation on the operation element, the control unit calculates target rotation speeds of the motors, based on a target vehicle speed provided by an operation position of the operation element, and on a target vehicle angular velocity provided by the operation position of the operation element and by the actual speed of the vehicle, and control the left and right motors such that actual rotation speeds of the motors follow the respective target rotation speeds.

9 Claims, 6 Drawing Sheets

SMALL ELECTRIC VEHICLE

CROSS REFERENCE TO RELATED APPLICATION

The present application claims priority of Japanese Patent Application No. 2021-012217 filed Jan. 28, 2021. The entire contents of which are hereby incorporated by reference.

TECHNICAL FIELD

The present invention relates to a small electric vehicle.

BACKGROUND

Small electric vehicles including cart-type electric rollators and electric wheelchairs for users having difficulty in walking, such as the elderly, have been publicly known. For example, JP 2014-064620 discloses a small electric vehicle (electric wheelchair) that includes left and right motors that individually drive respective left and right driving wheels, and is configured such that the numbers of revolutions of left and right motors are determined from an operation position of joystick-type operation means, the vehicle goes forward when an operation element is tilted forward, it turns when the piece is tilted obliquely forward, it turns about a fixed position when the piece is tilted obliquely backward, and it stops when the piece is tilted straight backward.

SUMMARY

As for the small electric vehicle as described above, the speed (speed difference between left and right) is determined by the operation position of the joystick-type operation element. Accordingly, in a case of turning at a slow speed, the operation element is required to be held at an intermediate operation position, which leads to a problem for a user to drive at an intended speed on a route.

The present invention has been made in view of the circumstances in the prior art described above, and it has as an object to provide a small electric vehicle that can achieve turning characteristics depending on the driving state, through intuitive operation on the joystick-type operation element.

To solve the problems, a small electric vehicle according to the present invention includes:
  a vehicle body that has a forward and backward direction, and a width direction;
  left and right driving wheels provided apart in the width direction of the vehicle body;
  free wheels provided apart from the left and right driving wheels in the forward and backward direction of the vehicle body;
  left and right motors connected so as to respectively transmit power to the left and right driving wheels;
  left and right rotation speed sensors for detecting rotation speeds of the left and right motors;
  an operation unit that includes a joystick-type operation element; and
  a control unit that controls the left and right motors according to an amount of operation on the operation element,
  wherein the control unit is configured to calculate target rotation speeds of the left and right motors, based on a target vehicle speed provided by an operation position of the operation element, and on a target vehicle angular velocity provided by the operation position of the operation element and by the actual speed of the vehicle, and control the left and right motors such that actual rotation speeds of the left and right motors follow the respective target rotation speeds.

As described above, the small electric vehicle according to the present invention is configured to calculate the target rotation speeds of the left and right motors, based on the target vehicle speed provided by the operation position of the joystick-type operation element, and on the target vehicle angular velocity provided by the operation position and the actual speed of the vehicle, and control the left and right motors such that the actual rotation speeds of the left and right motors follow the target rotation speeds. Accordingly, the turning characteristics can be changed so as to support the actual speed. Appropriate turning characteristics supporting the travel state can be obtained merely through intuitive operations on the joystick-type operation element. It is thus advantageous in operation simplicity, usability, and improvement in safety.

DETAILED DESCRIPTION

Hereinafter, embodiments of the present invention are described in detail with reference to the drawings.

Figure 1:
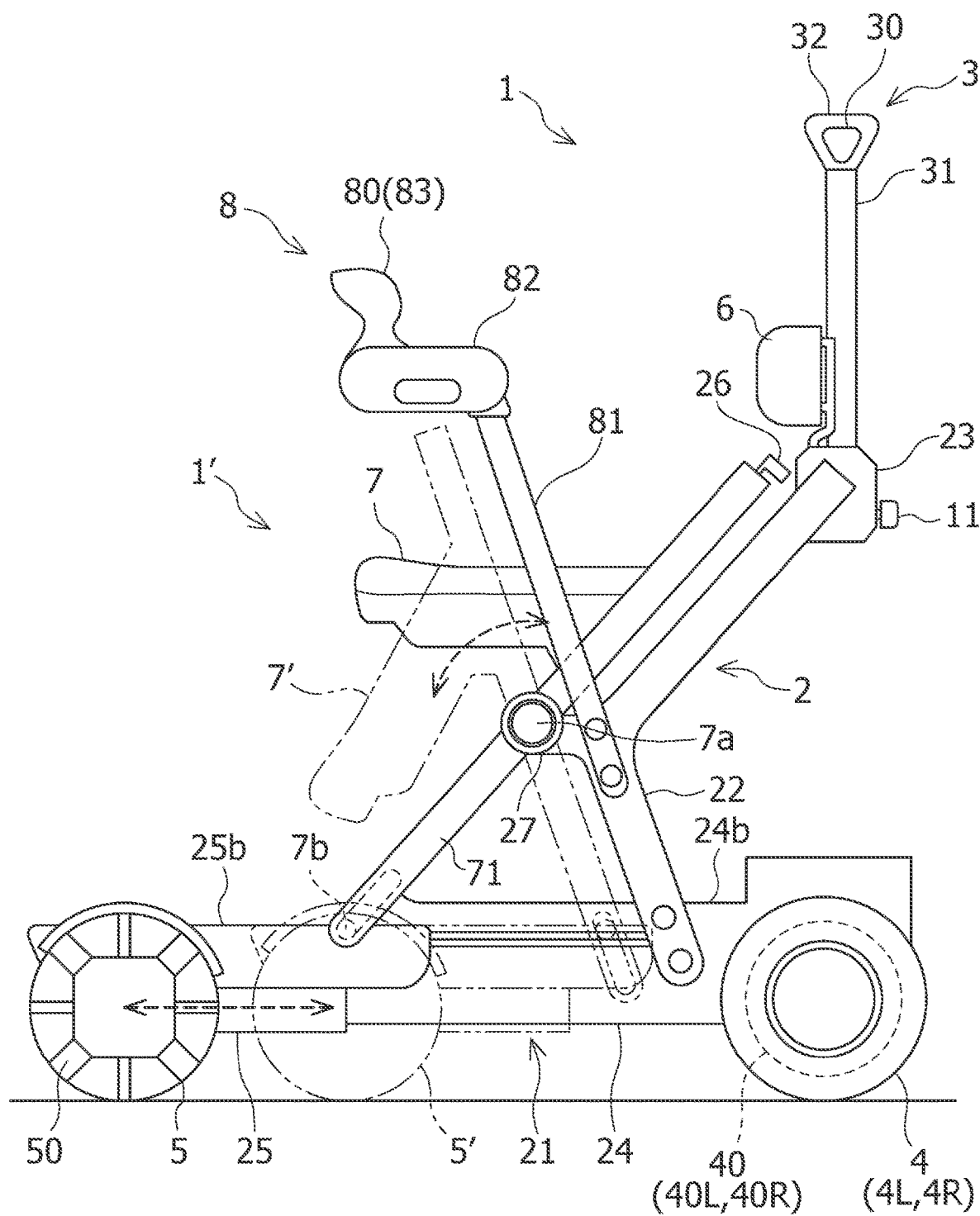
FIG. 1 is a side view showing a small electric vehicle.

In FIG. 1, an electric vehicle 1 according to an embodiment of the present invention includes a vehicle body 2 made up of a mobile base 21 (lower traveling body), and an upper frame 22 provided to stand from a rear part (rear-side base 24) of the mobile base 21, and is usable in a small electric vehicle mode (riding mode 1) indicated by solid lines in the diagram, and in a rollator mode (1') indicated by chain double-dashed lines in the diagram.

The mobile base 21 includes: the rear-side base 24 (main body part) provided with left and right driving wheels 4 (rear wheels), and the upper frame 22; and a front-side base 25 provided with left and right driven wheels 5 (front wheels). The front-side base 25 is joined to the front side of the rear-side base 24 slidably in the front and rear direction. The mobile base 21 is configured such that the wheelbase is expandable and contractible.

The left and right driving wheels 4 are independently driven respectively by left and right motor units 40 (40L and 40R) mounted on the rear-side base 24. The left and right driven wheels 5 is made up of free wheels (omni wheels, or omnidirectional wheels) including many rotatable rollers 50 at grounding parts around axes in circumferential directions. As described later, the electric vehicle 1 can be steered, braked, and driven only by controlling the left and right motor units 40L and 40R.

The upper frame 22 have an inverted U form or a gate shape formed by joining upper ends of a pair of left and right side frames provided to stand upward from both the left and right sides of the rear-side base 24, with an upper end frame extending in the vehicle width direction. A lower end part of a stem 31 of a rear handle 3 is rigidly coupled to a coupling part 23 at the center of the upper end frame in the vehicle width direction, and a seat backrest 6 is supported at the coupling part 23.

The rear handle 3 is formed in a T-bar shape that has a pair of grip parts extending left and right from a connection portion 32 with the upper end of the stem 31. At the left and right grip parts of the rear handle 3, grip sensors 30 that detect a state of gripping (hands on) by a user (or a helper) are provided. Touch sensors, such as capacitance sensors or pressure-sensitive sensors, can be used as the grip sensors 30. The left and right grip parts of the rear handle 3 serve as an operation unit in a case of use by the user himself or herself in the rollator mode (1'), and in a case in which the helper or the like operates the electric vehicle in a case in which the user is seated on the seat 7. Note that although omitted in FIG. 1, an electromagnetic brake release switch 34, and a speaker 35 are provided on the connection portion 32 at the center of the rear handle 3.

Base parts of support frames 81 for armrests 82 are fixed at bent parts at the middle of the upper frame 22 (side frames) in the height direction. A joystick 83, which constitutes a riding mode operation unit 8, is provided at a front end part of the armrest 82 on the right side, which is a deeper side in the FIG. 1. A display unit 80 and a travel permission switch 84 are provided on an upper surface of the grip part having the same shape at a front end part of the armrest 82 on the left side, which is a near side in FIG. 1.

A two-axis joystick that can be tilted to the front, rear, left, and right, and allows an output to be obtained depending on a tilted angle, or a multi-axis joystick involving this function may be used as the joystick 83. A non-contact joystick that uses a Hall sensor is preferable. The joystick 83 is configured such that an urging force (a restoring force or an operational reaction force) toward a neutral position depending on the tilted angle is applied, by an urging member (spring, etc.), not shown. In a state in which no operational force is applied, that is, a state in which the hand of the user is off the joystick 83, the joystick returns by itself to the neutral position. Control of the left and right motor units 40 (40L and 40R) through an operation on the joystick 83 is described later.

At a pivot support part 27 that protrudes forward from the bent parts of the upper frame 22 (side frames), support frames 71 for the seat 7 (seat cushion) are pivotably supported by a shaft 7a in the vehicle width direction. In addition, the lower ends of the support frames 71 are rotatably and slidably joined to the front-side base 25 (pins) via the joining parts 7b (slots).

According to the configuration described above, when the seat 7 at a seating position is turned downward ahead from the riding mode (1), indicated by the solid lines in the diagram, to a folded position (7') as indicated by chain double-dashed lines in the diagram, the front-side base 25 is slid backward in an interlocking manner, the mobile base 21 is shortened, and the mode becomes a rollator mode (1'), which allows user operation while standing and walking with the rear handle 3 being gripped.

Conversely, when the seat (7') at the folded position is moved from the rollator mode (1') to the seating position 7 by turning upward behind, the front-side base 25 slides forward, the mobile base 21 is elongated, and the mode becomes the riding mode (1). In this state, an upper surface 25b of the front-side base 25 moved ahead of a tray 24b can be used as a footrest for a passenger.

Note that locking mechanisms (locking pins or the like urged by urging members, such as springs) that lock the front-side base 25 at each of an elongated position and a shortened position are provided in the mobile base 21, where a vehicle state detection sensor 28 (mechanical switch etc.) that detects the locked state in each position is attached. Furthermore, urging members (springs, etc.) for urging toward the intermediate position (in a release direction) at each of the elongated position and the shortened position are provided. Release tags 26 joined to the locking mechanisms through Bowden cables are provided at upper end portions of the support frames 71.

Accordingly, the configuration is made such that when the release tags 26 are pulled at either of the elongated position and the shortened position, the locking mechanisms are released, the vehicle body 2 is at the intermediate position by being urged by the urging members, and when from this state the seat 7 (support frames 71) is turned forward or backward from the intermediate position against urging by the urging members, and the locking mechanisms are locked at either of the elongated position and the shortened position of the front-side base 25.

Figure 2:
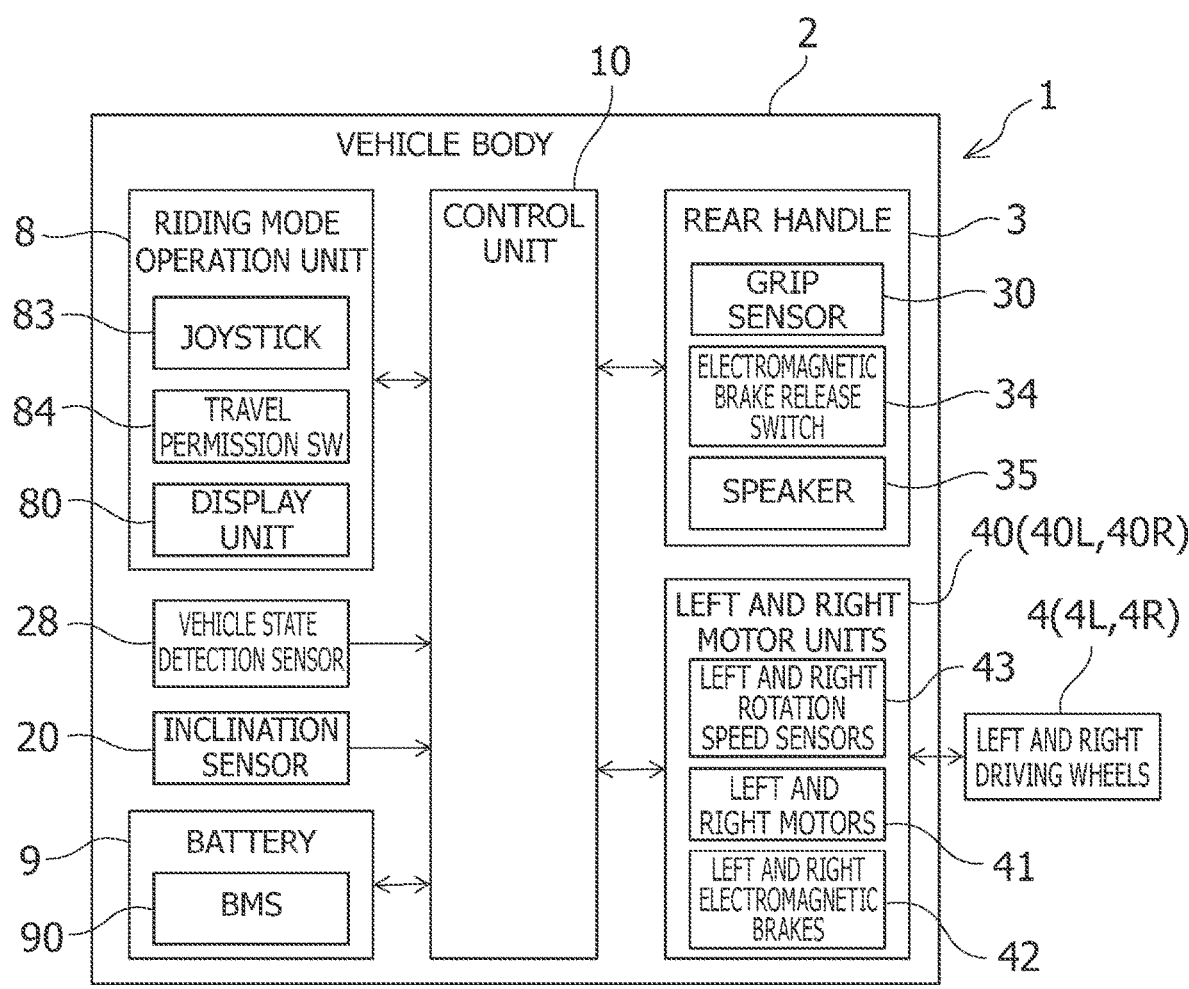
FIG. 2 is a block diagram showing a control system of the small electric vehicle.

FIG. 2 is a block diagram showing a control system of the electric vehicle 1. The electric vehicle 1 includes a battery 9 that supplies power to the left and right motor units 40 (40L and 40R), and a control unit 10 that controls the left and right motor units 40 (40L and 40R). The control unit 10 has an interlock function of executing control for each of the riding mode (1) and the rollator mode (1') in the locked state at the corresponding position detected by the vehicle state detection sensor 28.

In the riding mode (1), the grip sensors 30 are disabled, the control unit 10 is configured to control the speeds of the left and right motor units 40 (40L and 40R) on the basis of a control map, described later, in response to an operation (the amount of operation, and operation direction) on the joystick 83, which constitutes the riding mode operation unit 8, when the travel permission switch 84 is turned on, and allow drive operations that include going forward, backward, turning, and braking and stopping of the electric vehicle 1. Note that when an inclination equal to or greater than a predetermined threshold is detected by an inclination sensor 20, the target speed is corrected in consideration of the gravity (load) applied depending on the inclination.

On the other hand, in the rollator mode (1'), the riding mode operation unit 8 is disabled, the control unit 10 controls the torques of the left and right motor units 40 (40L and 40R) on the basis of detection information from the inclination sensor 20, the left and right rotation speed sensors 43 and the like and of a predetermined control map. Note that when an inclination equal to or greater than a predetermined threshold is detected by the inclination sensor 20, a compensation torque for compensating for the gravity (load), which is applied depending on the inclination, is superimposed on the torque command value. The grip sensor 30 only detects a grip (hands on/off) on the rear handle 3 by the user, and is not involved in the torque control of the motor units 40.

The control unit 10 includes: a computer (microcomputer) made up of a ROM that stores a program and data for executing control in each of the modes, a RAM that temporarily stores a computation processing result, a CPU that performs computation processes and the like; and a power source circuit that includes drive circuits (motor drivers) for the left and right motors 41, and a relay that turns the power of the battery 9 on and off.

The left and right motor units 40 (40L and 40R) each include a motor 41, an electromagnetic brake 42 that locks the rotor of the corresponding motor 41, and a rotational position sensor (43) that detects the rotational position of the corresponding motor 41. Drive shafts of the motors 41 are connected to the respective driving wheels 4 (4L and 4R) via reduction gears, not shown, in a power-transmissible manner.

The left and right motors 41 are made up of brushless DC motors that switch the currents in coils in corresponding phases in the drive circuits to support the phases of rotors detected by the rotational position sensors (43). In the riding mode (1), the rotational position sensors (Hall sensors) are used as vehicle speed sensors (43) that detect the actual speed of the electric vehicle 1. In the rollator mode (1'), the rotational position sensors are used as the rotation speed sensors 43.

The drive circuits for the left and right motors 41 include current sensors that detect coil currents. The coil currents correspond to the torques of the left and right motors 41. The control unit 10 executes the torque control of the left and right motors 41 by controlling the coil currents through PWM control (pulse width modulation control) or the like.

Preferably, the electromagnetic brakes 42 are negative actuated type electromagnetic brakes that lock the drive shafts of the motors 41 in an unexcited state, and release the locking in an excited state. By adopting the negative actuated type electromagnetic brakes, the electric vehicle 1 can be securely stopped when the key is turned off or at a stop without consuming power.

On the other hand, to cause the locks of the electromagnetic brakes 42 to be released and allow the electric vehicle 1 to be movable in case of urgency or emergency, for example, in a case in which it is intended to move the electric vehicle 1 without using the power of the motors 41, or in an undrivable case due to reduction in remaining battery charge, the electromagnetic brake release switch 34 is provided as forcible release means for the electromagnetic brakes 42. The electromagnetic brake release switch 34 is provided adjacent to the grip part of the rear handle 3, but is operable irrespective of detection of gripping of the grip sensor 30.

The inclination sensor 20 is implemented on a circuit board of the control unit 10 mounted in the mobile base 21 (rear-side base 24) of the vehicle body 2. A two-axis inclination sensor or an acceleration sensor that detects the inclinations in the front and rear direction and the lateral direction of the vehicle body 2, or a multi-axis inertial sensor in which the acceleration sensor and an angular acceleration sensor (gyroscope sensor) are integrated is usable.

(Travel Control in Riding Mode)

According to the electric vehicle 1 configured as described above, in the riding mode (1), the rotation speeds of the left and right motors 41 (40L and 40R) are controlled based on an operation (an amount of operation and an operation direction) of the joystick 83 by the user. However, the target rotation speeds of the left and right motors 41 (40L and 40R) are not immediately determined from the operation position of the joystick 83. Instead, the target vehicle speed (straight travel speed) based on the operation position of the joystick 83, and the target vehicle angular velocity based on the left and right direction components of the operation position of the joystick 83 are separately calculated. Based on these, the target rotation speeds of the left and right motors 41 (40L and 40R) corresponding to the rotation speeds of the left and right driving wheels 4 (4L and 4R) are calculated.

Figure 3:
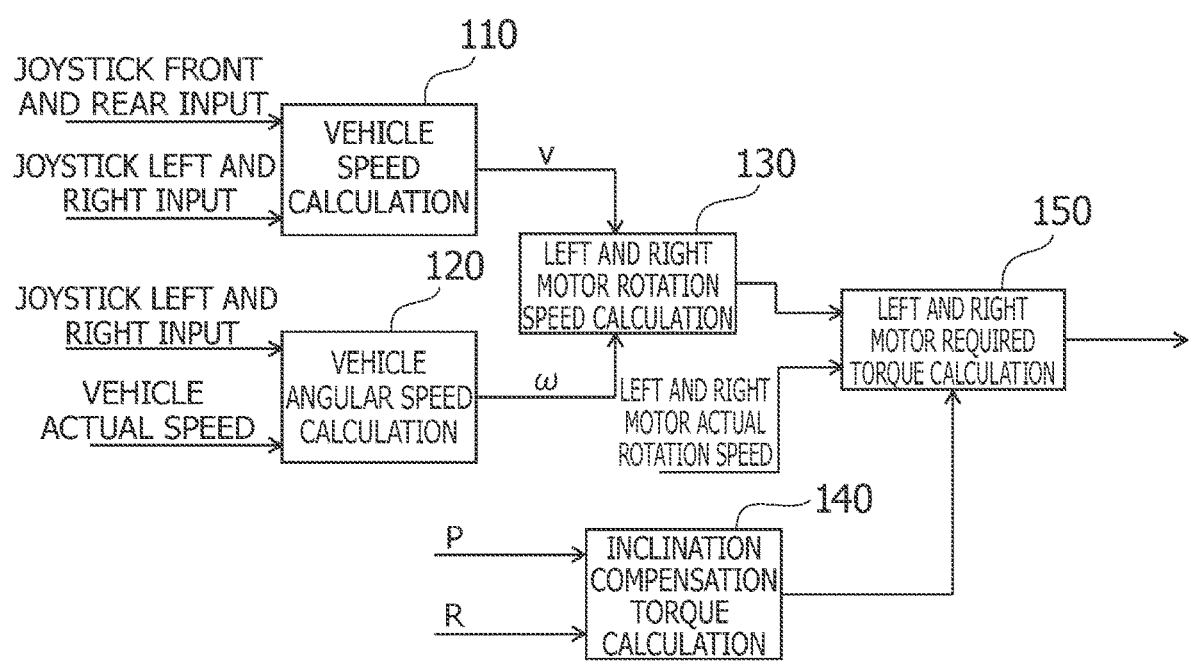
FIG. 3 is a block diagram showing left and right motor control.

That is, as shown in the block diagram of FIG. 3, for the target vehicle speed calculation block 110, not only inputs in the front and rear direction through the joystick 83 but also inputs in the left and right direction are used. Accordingly, speed control during turning, for example, deceleration traveling, which is different from that during straight traveling, can be executed without particular consideration. Not only left and right direction inputs on the joystick 83, but also the vehicle actual speed during operation is reflected in a target vehicle angular velocity calculation block 120. Accordingly, the turning characteristics can be changed depending on the traveling speed of the electric vehicle 1.

In the block diagram of FIG. 3, based on the target rotation speeds of the left and right motors 41 (40L and 40R) corresponding to the target vehicle speed v calculated by the target vehicle speed calculation block 110, and on the difference between the target rotation speeds of the left and right motors 41 (40L and 40R) corresponding to the target vehicle angular velocity ω calculated by the target vehicle angular velocity calculation block 120, the target rotation speeds of the left and right motors 41 (40L and 40R) are calculated in a left and right motor target rotation speed calculation block 130.

Furthermore, in the left and right motor required torque calculation block 150, based on the actual rotation speeds of the left and right motors 41 (40L and 40R) detected by the left and right rotation speed sensors 43, and on the target rotation speeds of the left and right motors 41 (40L and 40R), the required left and right motor torques are calculated by feedback control (e.g., PID control) that causes the actual rotation speeds of the left and right motors 41 (40L and 40R) to follow the respective target rotation speeds. Based on these, current control for the left and right motors 41 (40L and 40R) is executed.

When the inclination sensor 20 detects a vehicle inclination (the pitch angle P and the roll angle R) equal to or greater than a predetermined threshold, a compensation torque calculation block 140 calculates a compensation torque in a direction of compensating for the climbing/traveling downhill load applied depending on the pitch angle P and/or the lateral direction load applied depending on the roll angle R, and superimposes the torque on the left and right motor required torques calculated by the left and right motor required torque calculation block 150.

(Target Vehicle Speed Map)

Figure 4:
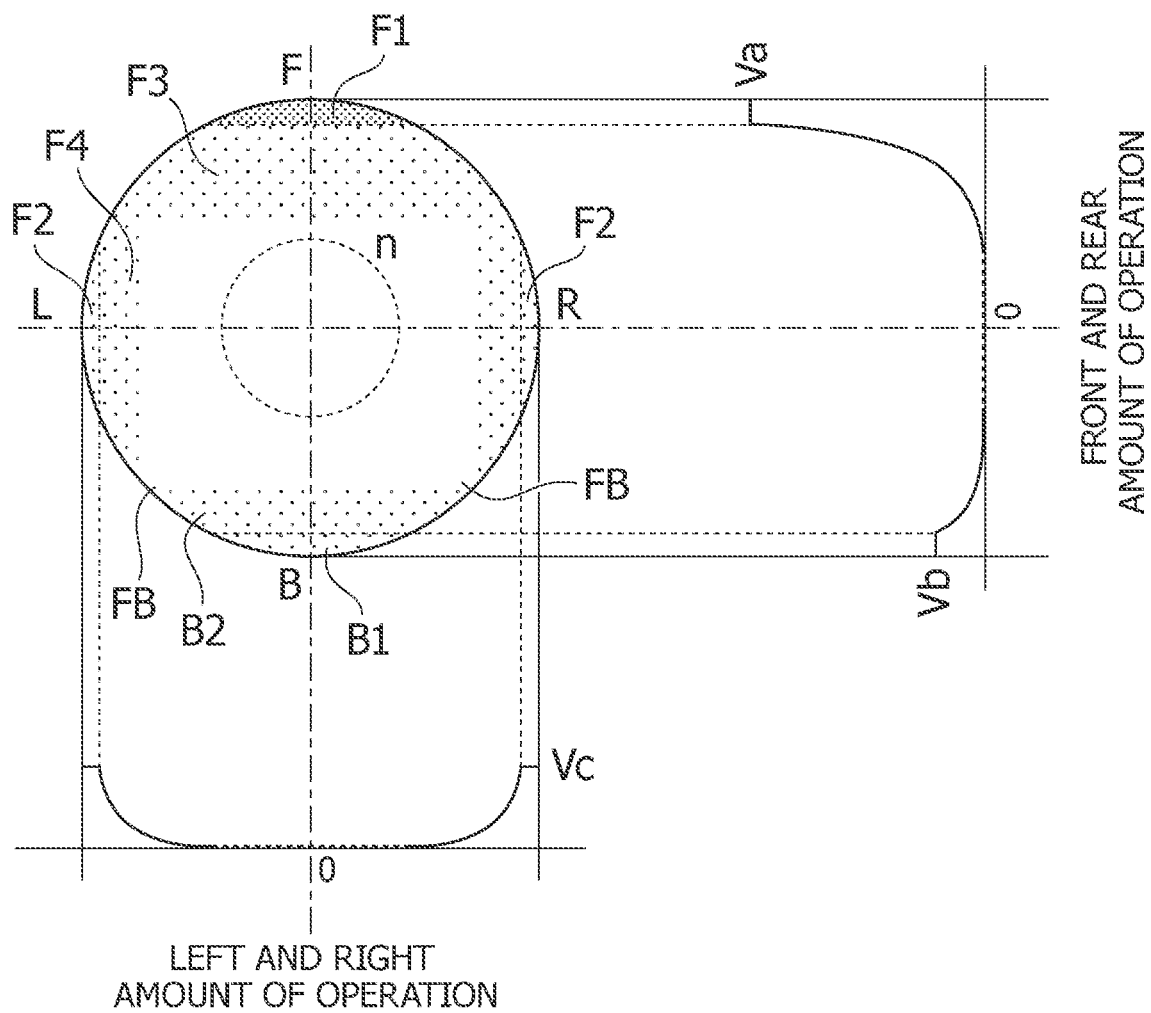
FIG. 4 shows a target vehicle speed map through a joystick operation.

FIG. 4 shows a target vehicle speed map for target vehicle speed calculation (110) through joystick operations. The target vehicle speed map is stored as a look-up table in the ROM area of the control unit 10.

In FIG. 4, when the operation position of the joystick 83 is in a forward region F1 including the front end in the operation range, a target forward speed va is designated. When the position in a backward region B1 including the rear end, a target backward speed vb is designated. When the operation position of the joystick 83 is in any of left and right side regions F2 including the left and right ends, a target forward speed vc is designated. When the position in a center region n including the center (neutral position), stopping (a target speed of zero) is designated.

As indicated in maps on the right side and the lower side in FIG. 4, the target forward speed va in the forward region F1 is higher than the target forward speed vc in the left and right side regions F2. The target forward speed vc in the left and right side regions F2 has a greater (or equal) absolute value than the target backward speed vb in the backward region B1 has. For example, the target forward speed va can be 3 to 5 km/h, the target forward speed vc can be 1 to 2 km/h, and the target backward speed vb can be 1 km/h.

Furthermore, in FIG. 4, transition regions F3 and F4 in which the target forward speed increases from the center region n toward the forward region F1 and the left and right side regions F2 are provided between the center region n and the forward region F1, and between the center region n and the left and right side regions F2. A transition region B2 in which the target backward speed increases from the center region n toward the backward region B1 is provided between the center region n and the backward region B1. When the operation position of the joystick 83 is in the transition region F3 or the transition region B2, an intermediate target forward speed or an intermediate target backward speed is designated.

Consequently, not only when the joystick 83 is operated to the forward region F1 (and its transition region F3) but also when the joystick 83 is operated to any of the left and right side regions F2 (and its transition region F4), the target forward speed vc is designated, thereby allowing the forward rotation to be output even when a target vehicle angular velocity ±ω from a target vehicle angular velocity calculation 120 block, described later, is input.

This is because the lateral movement of free wheels 5 made up of omni wheels is achieved by the rotation of the rollers 50, and the start performance and the step traveling performance are lower than those during straight traveling, and accordingly, the load on the system is reduced by preventing pivot turn (spin turn) due to an intuitive turning operation. Note that when the joystick 83 is operated obliquely backward FB, the target speed is zero at the middle between the left and right side regions F2 and the backward region B1. Pivot turn (spin turn) can be achieved at a narrow place, such as in a room or an elevator entrance.

(Target Vehicle Angular Velocity Map)

Figure 5:
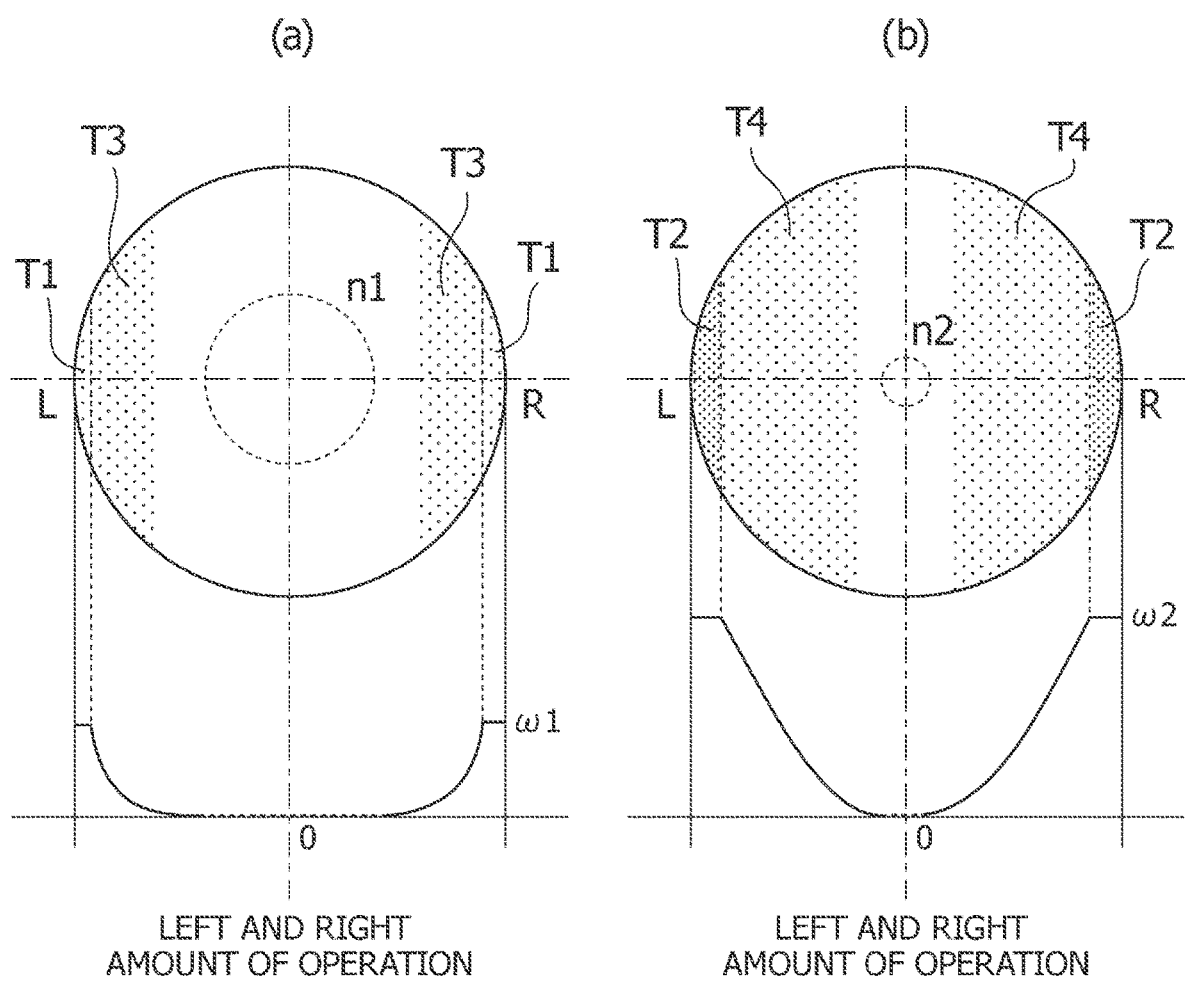
FIG. 5 shows a target angular velocity map for low speed (a), and a target angular velocity map for high speed (b), through joystick operations.

Next, FIG. 5 shows a target angular velocity map for target vehicle angular velocity calculation (120) through joystick operations. The target angular velocity map includes: a target angular velocity map for low speed (a) that defines the target vehicle angular velocity when the actual speed is in a low speed region or a speed of zero; and a target angular velocity map for high speed (b) that defines the target vehicle angular velocity when the actual speed is the maximum speed or in a predetermined high speed region in the setting speed region for the vehicle. These target angular velocity maps are also stored as look-up tables in the ROM area of the control unit 10.

According to the target angular velocity map for low speed (a), the target vehicle angular velocity ω1 is designated when the operation position of the joystick 83 is in left and right side regions T1 including the left and right ends in the operation range, and the target vehicle angular velocity of zero is designated when the position is in a center region n1 including the center (neutral position). Transition regions T3 in which the target angular velocity co gradually increases from the center region n toward the left and right side regions T1 are provided between the center region n1 and the left and right side regions T1.

Similarly, according to the target angular velocity map for high speed (b), the target vehicle angular velocity ω2 is designated when the operation position of the joystick 83 is in left and right side regions T2 including the left and right ends in the operation range, and the target vehicle angular velocity of zero is designated when the position is in a center region n2 including the center (neutral position). Transition regions T4 in which the target angular velocity co gradually increases from the center region n2 toward the left and right side regions T2 are provided between the center region n2 and the left and right side regions T2.

Here, the maximum target angular velocity ω2 in the left and right side regions T2 in the target angular velocity map for high speed (b) is greater than the maximum target angular velocity ω1 in the left and right side regions T1 in the target angular velocity map for low speed (a), and the center region n2 in the target angular velocity map for high speed (b) is narrower than the center region n1 in the target angular velocity map for low speed (a). The transition regions T4 in the target angular velocity map for high speed (b) are wider than the transition regions T3 in the target angular velocity map for low speed (a).

According to a preferable embodiment, the target angular velocity map for low speed (a) corresponds to a case in which the actual speed of the vehicle is equal to or less than 0.5 km/h, which can be substantially considered to be zero. The target angular velocity map for high speed (b) corresponds to a case in which the actual speed of the vehicle is 4.5 km/h. The maximum target angular velocity ω1 in the left and right side regions T1 in the target angular velocity map for low speed (a) is 30 degrees per second (0.52 rad/s). The maximum target angular velocity ω2 in the left and right side regions T2 in the target angular velocity map for high speed (b) is 60 degrees per second (1.05 rad/s) to 120 degrees per second (2.09 rad/s).

Note that instead of setting of the transition regions T4, in which the target angular velocity continuously changes depending on the operation position of the joystick 83, between the left and right side regions T2 and the center region n2, a region with an intermediate target angular velocity of, for example, 90 degrees per second (1.57 rad/s) may be set.

The control unit 10 calculates the actual speed of the electric vehicle 1 on the basis of the actual rotation speeds of the left and right motor units 40 (40L and 40R) detected by the respective rotation speed sensors 43. Depending on the vehicle actual speed, the target angular velocity map for low speed (a) or the target angular velocity map for high speed (b) is selectively applied. Alternatively, when the actual speed is in an intermediate speed region between the low speed region and the high speed region, the target angular velocity corresponding to the actual speed is calculated from the target angular velocity map for low speed (a) and the target angular velocity map for high speed (b).

For example, first and second, two-step, speed thresholds are configured. If during the application of the target angular velocity map for low speed (a) the actual speed becomes equal to or greater than the second speed threshold (e.g., 2.5 km/h) from the low speed region, the map is switched to the target angular velocity map for high speed (b). If during the application of the target angular velocity map for high speed (b) the actual speed becomes lower than the first speed threshold (e.g., 1.5 km/h) lower than the second speed threshold, the map is switched to the target angular velocity map for low speed (a). Such switching can reduce the map switching frequency, and perform stable control.

It may be configured such that to calculate the target angular velocity corresponding to the actual speed from the target angular velocity map for low speed (a) and the target angular velocity map for high speed (b), a target angular velocity may be designated to which target angular velocity designation values in the target angular velocity map for low speed (a) and the target angular velocity map for high speed (b) are proportionally distributed depending on the velocity of the current actual speed to the actual speed corresponding to the target angular velocity map for high speed (b).

According to the configuration of applying the target angular velocity map for low speed (a) and the target angular velocity map for high speed (b) depending on the actual speed as described above, the following turning characteristics can be obtained.

That is, when the electric vehicle 1 is substantially in a stop state (the actual speed is in the low speed region or the speed of zero), the relatively large center region n1 (insensitive zone) is set on both the left and right sides of the neutral position of the joystick 83. Even if the user operates the joystick 83 to the left or right in this range, the electric vehicle 1 does not start to move. Accordingly, as described above, immediate transition from the substantially stop state to the turning motion is prevented, and only when the user clearly intentionally operates the joystick 83 to any of the left and right side regions T1, forward traveling or turning is started.

On the other hand, when the actual speed of the electric vehicle 1 is in a high speed region, for example, when the user operates the joystick 83 forward and the vehicle is in a forward travelling state, the transition regions T4 are set adjacent to the left and right sides of the neutral position. By the user operating the joystick 83 from the forward tilted position to the left or right, traveling in a desired direction can be achieved while finely adjusting course, and the steerable performance fairly corresponding to the straight travel speed of the electric vehicle 1 can be obtained.

Embodiment of Joystick

Figure 6:
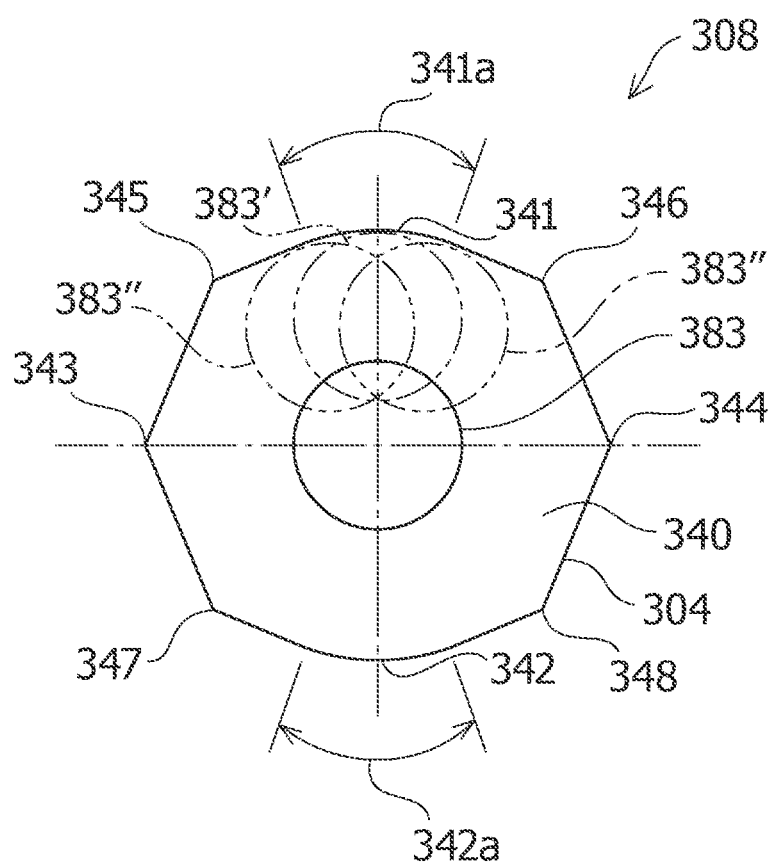
FIG. 6 is a schematic plan view showing a limiter plate of the joystick.

Next, FIG. 6 shows an embodiment of a joystick and a limiter plate 304 in a riding mode operation unit 308 suitable for the operation of the electric vehicle 1 as described above. The limiter plate 304 has a function of mechanically limiting the operation region (movable range) of a shaft part 383 of the joystick. As shown in FIG. 6, the limiter plate 304 includes an opening part (304) having a basic shape that is a regular-octagonal shape. Eight moderation parts 341 to 348 are formed on the edge portion of the opening part.

Among them, the moderation parts 341 and 342 positioned forward and backward with respect to the traveling direction are formed over predetermined angle ranges 341*a* and 342*a* so as to have an arc shape or a curved-line shape having a larger radius of curvature than the shaft part 383 has, and are continuous to adjoining edge portions.

According to this configuration, as indicated by chain double-dashed lines in the diagram, in a state of traveling forward with the joystick (383') being tilted immediately forward, the joystick (383") is moved to the left and right along the moderation part 341, and the operation for forward travel can be easily performed while the course is finely adjusted. Likewise, in a state of backward travel with the joystick (383) being operated backward, i.e., to the near side, the joystick is moved to the left and right along the moderation part 342, which advantageously allows the course to be easily, finely adjusted.

In addition, the other moderation parts 343 to 348 are corner portions having a smaller radius of curvature than the shaft part 383 has. Accordingly, a definitive moderating sense can be achieved at each of the moderation parts 343 to 348, and the joystick (383) is advantageously allowed to definitively move to the adjacent moderation part.

For example, the joystick (383) is operated from the forward moderation part 341 to any of the obliquely left and right forward moderation parts 345 and 346 to thereby allow transition to forward turning, is operated from the neutral position in the stop state to any of the left and right moderation parts 343 and 344 to thereby allow transition to forward turning, and is operated to the obliquely backward moderation parts 347 and 348 to thereby allow execution of pivot turn (spin turn).

In the electric vehicle 1 with the maximum speed being limited to a walking speed region (e.g., 6 km/h) or less, the user tends to perform a simple and definitive operation such that they tilt the joystick to the front end in the case of forward travel, and tilt it to the rear end in the case of backward travel. There is an advantage that while fine adjustment of the course using the forward and backward moderation parts 341 and 342 is allowed, the turning range can be limited (prevent excessive turning) using the obliquely forward moderation parts 345 and 346 smoothly continuous to the forward moderation part 341.

When the forward travel (341; the forward region F1 in FIG. 4) transitions to the forward turning (345 and 346; the transition region F3 in FIG. 4), deceleration is performed according to the target vehicle speed map. Accordingly, even without particular consideration, speed control in response to the steering operation can be executed, and turning characteristics supporting the traveling speed can be obtained.

As described in detail above, the electric vehicle 1 according to the present invention is configured to calculate the target rotation speeds of the left and right driving wheels 4 (4L and 4R), based on the target vehicle speed v provided by the operation position of the joystick 83, and on the target vehicle angular velocity ω provided by the operation position of the joystick 83 and the actual speed of the vehicle, and control the left and right motors 41 (40L and 40R) such that the actual rotation speeds of the left and right driving wheels 4 (4L and 4R) follow the target rotation speeds. Accordingly, the turning characteristics can be changed so as to support the actual speed. Appropriate turning characteristics supporting the travel state can be obtained only through intuitive operations on the joystick 83. It is thus advantageous in operation simplicity, usability, and improvement in safety.

In particular, the control unit 10 includes a target speed map that defines the relationship between the operation position of the joystick 83 and the target vehicle speed, and a target angular velocity map that defines the relationship between the operation position of the joystick 83 and the target vehicle angular velocity depending on the actual speed, and is configured to calculate the target rotation speeds of the left and right driving wheels 4 (4L and 4R). Accordingly, a stable small electric vehicle can be configured while avoiding complication of control.

Furthermore, the target speed map has the forward region F1 that includes the front end in the operation range of the joystick 83, the backward region B1 that includes the rear end, the left and right side regions F2 that include the left and right ends, and the center region n that includes the center. The forward region F1 indicates a first target forward speed (va). The backward region B1 indicates a target backward speed (vb). The left and right side regions F2 indicate a second target forward speed (vc). The center region n indicates stopping. The first target forward speed (va) is greater than the second target forward speed (vc), and the second target forward speed (vc) has an absolute value greater than or equal to that of the target backward speed (vb). Accordingly, there are advantages that even when the joystick 83 is operated to any of the left and right side regions F2 to turn, the forward speed can be obtained, the load on the system of the small electric vehicle 1 including the left and right driving wheels 4 (4L and 4R) and the free wheels (omni wheels) 5 is reduced, and a practical and lightweight system can be configured with a motor having a relatively lower output.

Between the center region n, and the forward region F1, the backward region B1 and the left and right side regions F2, the target speed map has the transition regions F3, F4 and B2 in which a target speed increases from the center region n to each of the regions F1, F2 and B1. Accordingly, the target speed can be input depending on the amount of operation on the joystick 83. Continuous and smooth control can be achieved while reducing the load on the motors.

In addition, the target angular velocity map includes the target angular velocity map for high speed (b) that defines the target vehicle angular velocity when the actual speed is at the maximum speed or in the predetermined high speed region in the setting speed region of the electric vehicle 1, and the target angular velocity map for low speed (a) that defines the target vehicle angular velocity when the actual speed is in the low speed region or the speed of zero. Each map has the left and right side regions (T1 and T2) including the left and right ends in the operation range of the joystick 83, and the center region (n1 and n2) including the center. The left and right side regions indicate the maximum target angular velocities ($\omega 1$ and $\omega 2$). The center region indicates the target angular velocity of zero. The maximum target angular velocity $\omega 2$ of the target angular velocity map for high speed (b) is greater than the maximum target angular velocity $\omega 1$ of the target angular velocity map for low speed (a). The control unit 10 selectively applies the target angular velocity map for high speed (b) or the target angular velocity map for low speed (a) depending on the actual speed of the electric vehicle 1. Accordingly, by simple control of applying the control map depending on the actual speed, the turning characteristics and steerable performance in conformity with the operational intention of the user and the traveling speed of the electric vehicle 1 can be obtained.

The target angular velocity map for high speed (b) and the target angular velocity map for low speed (a) each have the transition regions T3 and T4 in which the target angular velocity increases from the center region toward the left and right side regions, between the center regions n1 and n2 and the left and right side regions T1 and T2. Accordingly, abrupt turning motion can be suppressed. Continuous and smooth control can be achieved while reducing the loads on the motors. The straight traveling can smoothly transition to forward turning, and pivot turn.

In particular, by the configuration in which the center region n2 of the target angular velocity map for high speed is configured to be narrower than the center region n1 of the target angular velocity map for low speed, the sensitivity of the steering operation through the joystick 83 is high during forward travel in the high speed region, and traveling in a desired direction while finely adjusting the course through the joystick 83 can be achieved. In addition, in the low speed region and at a stop, the insensitive zone of the operation on the joystick 83 can be sufficiently secured. It is advantageous that a start of motion and an erroneous operation due to a behavior of the user placing a hand on the joystick 83 and the like can be prevented.

The embodiments of the present invention have been described above. However, the present invention is not limited to the embodiments. Based on the technical concept of the present invention, various modifications and changes can further be made.

For example, in the embodiments described above, the case in which the electric vehicle 1 has the rollator mode has been described. However, the present invention can be implemented as a small electric vehicle or an electric wheelchair that has no rollator mode.

In the embodiments described above, the case of including the omni wheels as driven wheels 5 has been described. Alternatively, caster type free wheels may be included.

The invention claimed is:

1. A small electric vehicle comprising:
    a vehicle body that has a forward and backward direction, and a width direction;
    left and right driving wheels provided apart in the width direction of the vehicle body;
    free wheels provided apart from the left and right driving wheels in the forward and backward direction of the vehicle body;
    left and right motors connected so as to respectively transmit power to the left and right driving wheels;
    left and right rotation speed sensors detecting rotation speeds of the left and right motors;
    an operation unit that comprises an operation element as a joystick; and
    a control unit that controls the left and right motors according to an amount of operation on the operation element,
    wherein the control unit is configured to calculate target rotation speeds of the left and right motors, based on a target vehicle speed provided by an operation position of the operation element, and on a target vehicle angular velocity provided by a left and right direction component of the operation position of the operation element and by an actual speed of the vehicle, and control the left and right motors such that actual rotation speeds of the left and right motors follow the respective target rotation speeds.

2. The small electric vehicle according to claim 1,
    wherein the control unit includes a memory storing a target speed map that defines a relationship between the operation position of the operation element and the target vehicle speed, and a target angular velocity map that defines a relationship between the operation position of the operation element and the target vehicle angular velocity depending on the actual speed, and is configured to calculate target rotation speeds of the left and right driving wheels according to the target speed map and to the target angular velocity map depending on the actual speed.

3. The small electric vehicle according to claim 2,
    wherein the target speed map comprises: a forward region that includes a front end in an operation range of the operation element; a backward region that includes a rear end; left and right side regions that respectively include left and right ends; and a center region that includes a center, and
    the forward region provides an indication on a first target forward speed, the backward region provides an indication on a target backward speed, the left and right side regions provide an indication on a second target forward speed, and the center region provides an indication on stopping, and the first target forward speed is greater than the second target forward speed, and the second target forward speed has an absolute value greater than or equal to an absolute value of the target backward speed.

4. The small electric vehicle according to claim 3,
    wherein between the center region and the forward region, the center region and the backward region, and the center region and the left and right side regions, the target speed map has transition regions in which a target speed increases from the center region to each of the regions.

5. The small electric vehicle according to claim 2, wherein the target angular velocity map comprises: a target angular velocity map for high speed that defines the target vehicle angular velocity when the actual speed is a maximum speed or in a predetermined high speed region in a setting speed region for the vehicle; and a target angular velocity map for low speed that defines the target vehicle angular velocity when the actual speed is in a low speed region or is a speed of zero, the target angular velocity map for high speed and the target angular velocity map for low speed each include left and right side regions including left and right ends, and a center region including a center, in an operation range of the operation element, and the left and right side regions provide an indication of a maximum target angular velocity, the center region provides an indication of a target angular velocity of zero, and a maximum target angular velocity of the target angular velocity map for high speed is greater than a maximum target angular velocity of the target angular velocity map for low speed, and the control unit is configured to selectively apply the target angular velocity map for high speed or the target angular velocity map for low speed, according to the actual speed of the vehicle.

6. The small electric vehicle according to claim 5, wherein when the actual speed is in an intermediate speed region between the high speed region and the low speed region or the speed of zero, the control unit is configured to apply a target angular velocity map for intermediate speeds, or calculate the target angular velocity corresponding to the actual speed from the target angular velocity map for high speed and the target angular velocity map for low speed.

7. The small electric vehicle according to claim 5, wherein the target angular velocity map for high speed and the target angular velocity map for low speed each include transition regions in which a target angular velocity increases from the center region to the left and right side regions, between the center region and the left and right side regions.

8. The small electric vehicle according to claim 5, wherein the center region of the target angular velocity map for high speed is narrower than the center region of the target angular velocity map for low speed.

9. The small electric vehicle according to claim 3, wherein the operation unit comprises a limiter plate that defines a movable range of the operation element, the limiter plate comprises a forward moderation part corresponding to the forward region in the target speed map, a backward moderation part corresponding to the backward region, left and right side moderation parts corresponding to the respective left and right side regions, and left and right forward moderation parts and left and right backward moderation parts residing therebetween, and the forward moderation part and the backward moderation part are formed to have an arc shape or a curved-line shape that has a radius of curvature greater than a radius of curvature of a periphery of the operation element.

* * * * *